Oct. 17, 1933.  W. B. STURGIS  1,931,303
FLY ROD HANDLE
Filed July 14, 1932
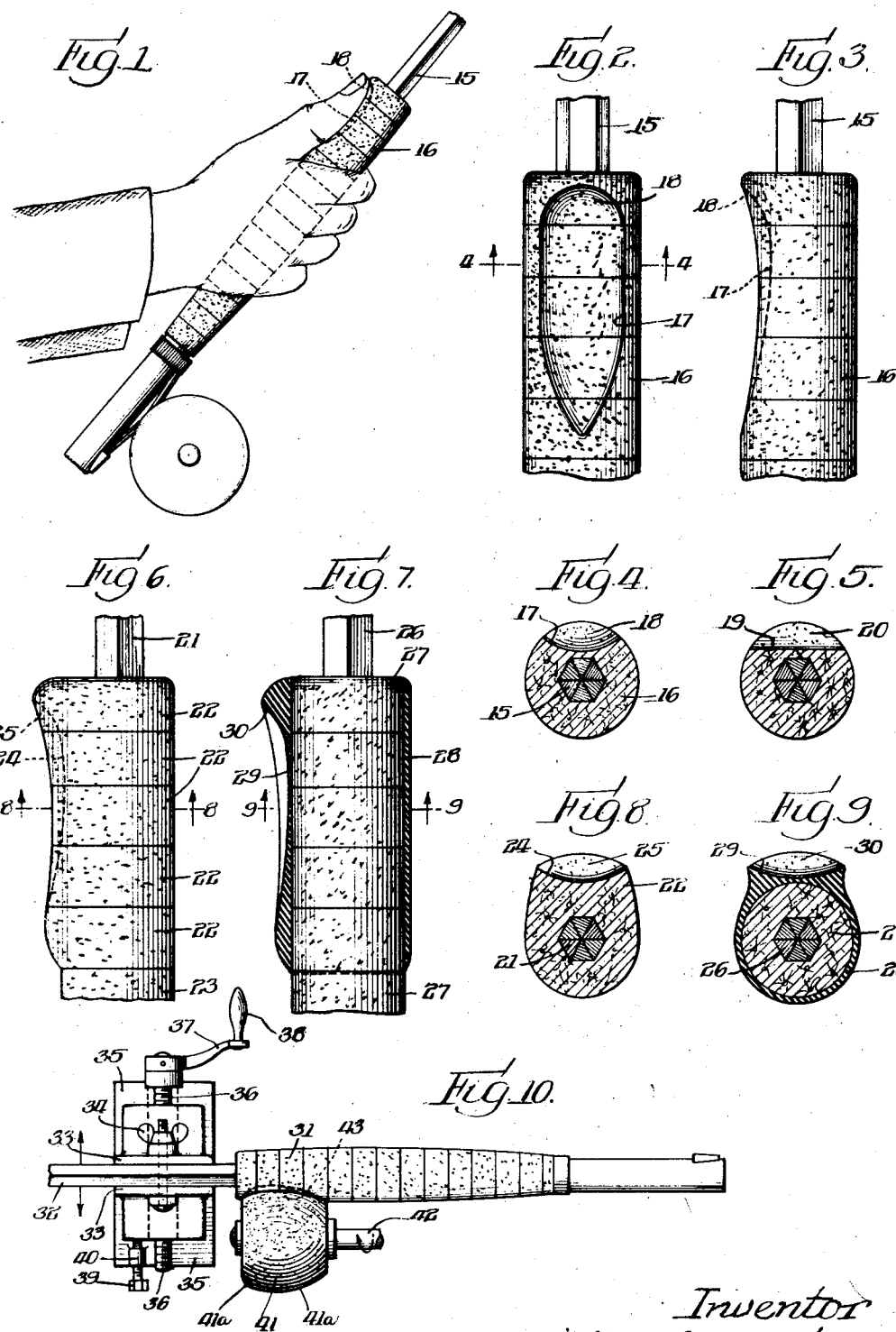
Inventor
William Bayard Sturgis.

Patented Oct. 17, 1933

1,931,303

UNITED STATES PATENT OFFICE 1,931,303

FLY ROD HANDLE

William Bayard Sturgis, Chicago, Ill.

Application July 14, 1932. Serial No. 622,485

3 Claims. (Cl. 43—23)

The present invention pertains to fly rods, and is particularly concerned with the handles of said rods.

One object of the invention is to provide, in rods of this character, a simple means whereby a much more comfortable and firm grip is obtained, with less effort on the part of the angler, than is afforded by anything heretofore used or proposed.

Other distinct and advantageous objects of my invention are apparent in the ensuing detailed description.

Handles for fly rods are generally made of cork, although, in some instances wood, vulcanized rubber, and similar substances have been used. My invention is applicable to all.

As fly rod handles are usually trued up in a simple lathe, (or a similar turning machine), they are circular in cross-section throughout their entire length. In many cases, they are shaped so that the diameter tapers down at the forward end to very nearly the diameter of the rod itself. This is a most inefficient design and tiresome to use, as the small diameter occurs precisely where the first and second fingers of the hand grip the rod. It is principally with these two fingers, (together with the thumb), that most of the grip is obtained, and a small diameter causes cramps in the muscles of the hand. For use with my invention, therefore, handles which are substantially cylindrical, or only slightly barrel shaped, are greatly to be preferred.

The most serious disadvantage of all handles heretofore made, (and especially the tapered ones referred to in the last paragraph above), is caused by the circular cross-section. In the casting of a fly, when the rod is held properly, the thumb is placed along the handle, (not around it as are the fingers), the ball of the thumb pressing against the handle to provide the driving force. Owing to the fact that both the handle and the ball of the thumb are circular in cross-section, the bearing surface under the thumb is too narrow. This, during the course of a day's fishing, causes soreness, sometimes blistering.

Another disadvantage in the circular cross-section is that it detracts from accuracy in casting, a most important factor in dry fly fishing. This is because the thumb has a tendency to slip around the handle, thereby causing the driving force to be applied at an angle to the direction in which it is desired to cast the fly.

The foregoing difficulties are instantly overcome when the handle is provided with a cupular indentation to fit the ball of the thumb. The grip is then made secure and comfortable, whereby accuracy and pleasure in casting are much enhanced.

In the drawing:

Fig. 1 is a longitudinal view of a fly rod handle embodying my invention and illustrating its application.

Fig. 2 is a top view showing in detail the construction and arrangement of the cupular indentation.

Fig. 3 is a side view of the handle.

Fig. 4 is a transverse section on the line 4—4 of Fig. 2.

Fig. 5 is a transverse section of a modified form of handle in which the indentation is curved on its longitudinal axis in a manner similar to that shown in Fig. 3, but differs from Fig. 3 in that it is flat on its transverse axis.

Fig. 6 is a side view of a specially constructed handle with the cupular indentation raised above the normal level of the surface of the handle.

Fig. 7 is a view partly in section and partly in side elevation of a handle in which the cupular indentation is formed in a removable elastic sleeve, on the front end of the handle.

Fig. 8 is a transverse section on the line 8—8 of Fig. 6.

Fig. 9 is a transverse section on the line 9—9 of Fig. 7.

Fig. 10 is a plan view of a mechanism for cutting the cupular indentation in the handle of a fly rod, showing a rod supported in a movable clamp, with the handle of the rod in contact with an especially shaped, rotatable, abrasive wheel.

In Fig. 1, especial attention is directed to the manner in which the end, as well as the ball, of the thumb fits snugly into the cupular indentation formed in the rod handle adjacent its forward end. The end of the thumb is plainly seen to butt up against the abruptly rising forward wall of said indentation.

In Fig. 2, Fig. 3, and Fig. 4, (which represent other views of the handle shown in Fig. 1), numeral 15 is the hexagonal split bamboo rod, numeral 16 is the cork handle, numeral 17 is the cupular indentation, and numeral 18 is the abruptly rising forward wall of said indentation.

In Fig. 5, (the modification), the bottom of the indentation 19 is flat on its transverse axis. When viewed from the side, the profile is the same as that shown by the dotted line representing the bottom of the cupular indentation in Fig. 3, the abrupt forward wall 20 corresponding to the abrupt forward wall 18 in Fig. 3.

In Fig. 6, numeral 21 is the rod, numeral 22 represents the especially shaped sections of cork, numeral 23 is the circular portion of the handle, numeral 24 is the raised cupular indentation in the especially shaped sections 22, the numeral 25 is the abrupt forward wall of said cupular indentation.

In Fig. 7, numeral 26 is the rod, numeral 27 is the cork handle, numeral 28 is the elastic sleeve, numeral 29 is the cupular indentation formed in the elastic sleeve, and numeral 30 is the abrupt forward wall of said indentation.

In Fig. 8, which is a transverse section taken on the line 8—8 of Fig. 6, numeral 21 is the rod, numeral 22 is one of the especially shaped cork sections, numeral 24 is the cupular shaped indentation, and numeral 25 is the abrupt forward wall of said indentation.

In Fig. 9, (which is a transverse section of Fig. 7 taken on the line 9—9), numeral 26 is the rod, numeral 27 is the cork handle, numeral 28 is the elastic sleeve, numeral 29 is the cupular indentation formed in said sleeve, and numeral 30 is the abrupt forward wall of said indentation.

All the cupular indentations shown in Fig. 1, Fig. 2, Fig. 3, Fig. 4, Fig. 6, Fig. 7, Fig. 8, and Fig. 9 are concave on both their longitudinal and transverse axes, and are characterized by the abruptly rising wall at their forward ends, thereby providing an exact counterpart of the curved shape of the ball and end or tip of the thumb. Concave surfaces, as shown in Fig. 5, are a decided improvement over the circular cross-section, and come within the scope of my invention, but a cupular indentation, (concave on both axes), is most efficient and comfortable.

In addition to the foregoing advantages described, my cupular "thumb-rest" enables the user to exert a pushing force in a direction lengthwise of the handle in connection with forward movement of the fly rod in the act of casting and prevents the rod from turning in the hand, (an annoying and inexcusable fault). This turning not only causes the reel to shift around and out of position, (necessitating fumbling for the reel handle), but, in addition, the handle of the reel catches the line, resulting in disaster when a large fish is struck.

In order to make my invention readily available to those already owning rods, (whereby it is unnecessary for them to return their rods to the factory for alteration), I have devised a removable elastic sleeve incorporating my invention. This elastic sleeve, shown in longitudinal cross-section in Fig. 7 and indicated by the numeral 28, is readily slipped over the rod handle, numeral 27.

The commercial success of an invention of the foregoing nature is largely dependent upon the simplicity of the machinery required for producing it. I have therefore invented and perfected a simple device to accomplish this end. This device, (shown in Fig. 10), comprises, as previously stated, a clamp for holding the rod securely, a rotating abrasive wheel, (the face of which is shaped to the exact form of cupule desired), and means whereby the handle of the rod is brought into contact with said abrasive wheel. Referring to Fig. 10: Numeral 31 is the rod handle formed of substantially cylindrical sections of cork. Numeral 32 is the rod itself, held between the jaws of the clamp, numeral 33. Numeral 34 is a wing nut for tightening the clamp. This clamp is movably mounted on a slotted base plate, numeral 35, and is provided with a feed screw, numeral 36, to one end of which is attached a crank arm, numeral 37, equipped with a handle, numeral 38. An adjustable stop is provided which comprises a screw, numeral 39, engaging a lug, numeral 40, attached to the base plate, numeral 35. An abrasive wheel, numeral 41, mounted on a rotatable shaft, numeral 42, is driven by any suitable means, such as an electric motor, (not shown). Attention is directed to the particular shape of the face of the abrasive wheel, numeral 41a, which is such that, when the handle of the rod is brought into contact with said wheel, by turning the crank arm, numeral 37, a cupular shaped indentation of the exact desired form is cut in the handle of the rod. The surface of the cupular shaped indentation, numeral 43, thus made by the grinding wheel, is smooth and perfect, and requires no further labour in finishing. The entire cutting operation requires less than one minute. To do the same work carefully by hand requires at least one hour, and the results are generally irregular and much inferior to those produced by my device.

I claim:

1. As a new article of manufacture, a fly-rod handle designed and constructed to be applied to the rod in front of the reel seat and to be held in the user's casting hand in such a manner that the fingers underlie and extend transversely around it and the thumb extends forwardly along the top portion thereof and having adjacent the front end of said top portion an elongated, longitudinally extending, concave socket for receiving the ball and tip of the thumb and holding the thumb in substantially parallel relation with the handle, said socket having an abruptly curved front wall shaped substantially conformably to the tip of the thumb and adapted to form an abutment of comparatively large area for the thumb tip whereby a pushing force may be exerted by the thumb in a direction lengthwise of the handle in connection with forward movement of the rod in the act of casting.

2. As a new article of manufacture, a fly-rod handle designed and constructed to be applied to the rod in front of the reel seat and to be held in the user's casting hand in such a manner that the fingers underlie and extend transversely around it and the thumb extends forwardly along the top portion thereof and having adjacent the front end of said top portion an elongated, longitudinally extending socket for receiving the ball and tip of the thumb and for holding the thumb in substantially parallel relation with the handle, said socket being concave transversely thereof as well as longitudinally to prevent sidewise slipping of the thumb and having an abruptly curved front wall shaped substantially conformably to the tip of the thumb and adapted to form an abutment of comparatively large area for the thumb tip whereby a pushing force may be exerted by the thumb in a direction lengthwise of the handle in connection with forward movement of the rod in the act of casting.

3. As a new article of manufacture, a fly-rod handle designed and constructed to be held in the user's casting hand in such a manner that the fingers underlie and extend transversely around it and the thumb extends forwardly along the top portion thereof and having adjacent the front end of said top portion an elongated, longitudinally extending, concave socket for receiving the ball and tip of the thumb and holding the thumb in substantially parallel relation with the handle, said socket having a gradually curved rear wall to fit the contour of the rear portion of the ball of the thumb and an abruptly curved front wall shaped substantially conformably to the tip of the thumb and adapted to form an abutment of comparatively large area for the thumb tip whereby a pushing force may be exerted by the thumb in a direction lengthwise of the handle in connection with forward movement of the rod in the act of casting.

WILLIAM BAYARD STURGIS.